UNITED STATES PATENT OFFICE.

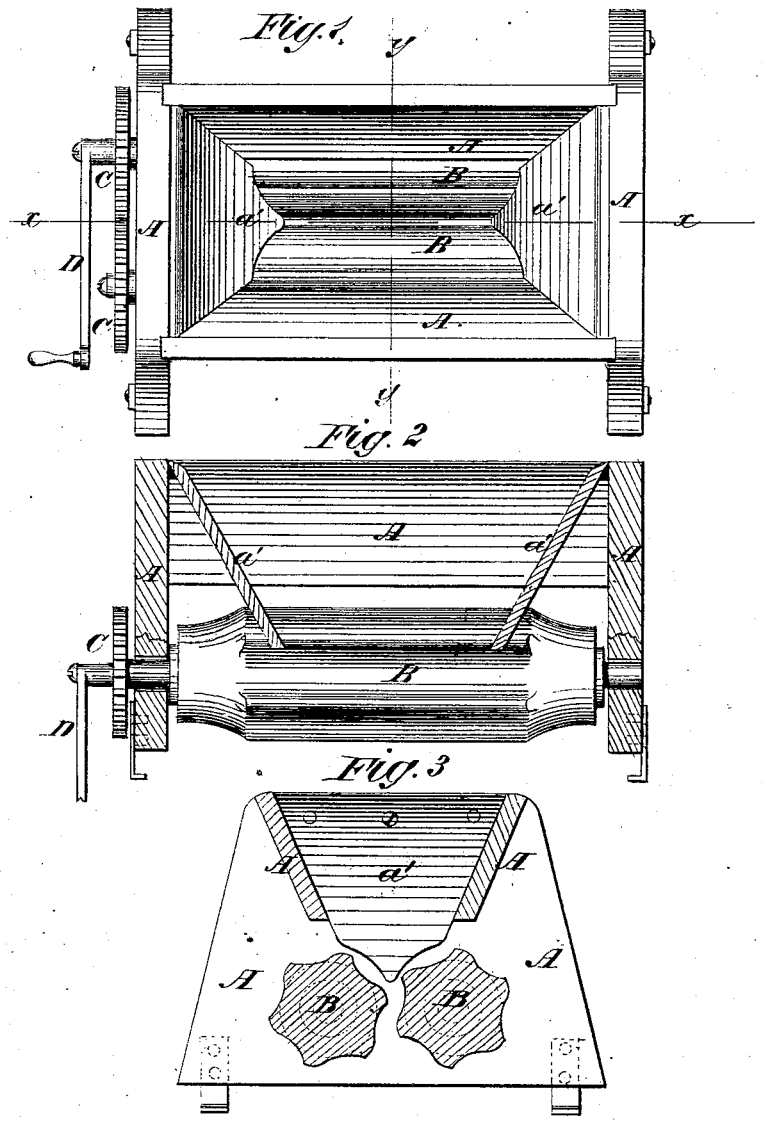

FRANK B. ALDRICH, OF CHICAGO, ILLINOIS.

IMPROVEMENT IN BUTTER-WORKERS.

Specification forming part of Letters Patent No. 160,293, dated March 2, 1875; application filed January 25, 1875.

*To all whom it may concern:*

Be it known that I, FRANK B. ALDRICH, of Chicago, Cook county, Illinois, have invented a new and useful Improvement in Butter-Workers, of which the following is a specification:

Figure 1 is a top view of my improved butter-worker. Fig. 2 is a vertical longitudinal section of the same, taken through the line $x\,x$, Fig. 1; and Fig. 3 is a vertical cross-section of the same, taken through the line $y\,y$, Fig. 1.

Similar letters of reference indicate corresponding parts.

My invention has for its object to furnish an improved butter-worker, the rollers of which shall be so formed as to take hold of the lumps of butter and draw them through the machine, and to prevent the butter from working out to the ends of the rollers, and there sticking.

My invention consists in the rollers in a butter-worker grooved longitudinally in such a way that the projections or ribs between said grooves may be concaved upon the forward side, and rounded upon the rear side, and concaved or beveled upon their end parts, as hereinafter fully described.

A represents the hopper, in which the butter is placed to be worked, and which is made with inclined sides and vertical ends, as shown in Figs. 1, 2, 3. The vertical ends project below the inclined sides, and to and between their lower parts are pivoted the ends of the rollers B. The journals of the rollers B project at one end, and have equal-sized gear-wheels C attached to them, the teeth of which mesh into each other, and to one of them, or to the journal to which it is attached, is secured the crank D by which motion is given to the rollers B. The faces of the rollers B are grooved longitudinally, which grooves are so formed that the projections or ribs between them may be concave upon their forward sides, and rounded upon their rear sides, as shown in Fig. 3. The rollers B are so arranged that the rib or projections of each roller may move through the cavity of the other roller, but not touch. By this construction, as the rollers B revolve toward each other, the ribs of the rollers will take hold of the butter, and draw it in so that it will be carried between the rollers and crushed. The end parts of the rollers B are concaved, as shown in Fig. 2, or beveled, so that should any of the butter work out to the ends of said rollers it may not stick to them, but fall off into the vat placed beneath the worker. $a'$ are two guard-plates placed in inclined positions in the ends of the hopper A, and the upper ends of which are attached to the upper parts of the ends of the said hopper. The lower ends of the guard-boards $a'$ are concaved upon the corners to fit into the space between the rollers B, and prevent the butter from working out between the end parts of the said rollers.

Having thus described my invention, I claim as new and desire to secure by Letters Patent—

The rollers B in a butter-worker, grooved longitudinally in such a way that the projections or ribs between said grooves may be concave upon the forward side, and rounded upon the rear side, and concaved or beveled upon their end parts, substantially as herein shown and described.

FRANK B. ALDRICH.

Witnesses:
   JOE N. PLATT,
   M. TOBIN.